United States Patent
Nahrwold et al.

(10) Patent No.: US 11,255,438 B2
(45) Date of Patent: Feb. 22, 2022

(54) SEAL ARRANGEMENT

(71) Applicant: Carl Freudenberg KG, Weinheim (DE)

(72) Inventors: Olaf Nahrwold, Ludwigshafen (DE); Stefan Sindlinger, Weinheim (DE); Boris Traber, Hirschberg (DE); Sascha Moeller, Buerstadt (DE)

(73) Assignee: CARL FREUDENBERG KG, Weinheim (DE)

( * ) Notice: Subject to any disclaimer, the term of this patent is extended or adjusted under 35 U.S.C. 154(b) by 130 days.

(21) Appl. No.: 16/766,753

(22) PCT Filed: Aug. 13, 2018

(86) PCT No.: PCT/EP2018/071917
§ 371 (c)(1),
(2) Date: May 26, 2020

(87) PCT Pub. No.: WO2019/105606
PCT Pub. Date: Jun. 6, 2019

(65) Prior Publication Data
US 2020/0370653 A1 Nov. 26, 2020

Related U.S. Application Data

(63) Continuation of application No. PCT/EP2018/071917, filed on Aug. 13, 2018.

(30) Foreign Application Priority Data

Nov. 28, 2017 (DE) .................. 10 2017 010 979.6
Nov. 28, 2017 (DE) .................. 10 2017 010 981.8
Feb. 6, 2018 (DE) .................. 10 2018 000 935.2

(51) Int. Cl.
*F16J 15/3296* (2016.01)
*F16J 15/3216* (2016.01)
*F16J 15/3284* (2016.01)

(52) U.S. Cl.
CPC ....... *F16J 15/3216* (2013.01); *F16J 15/3284* (2013.01); *F16J 15/3296* (2013.01)

(58) Field of Classification Search
CPC .. F16J 15/064; F16J 15/16; F16J 15/32; F16J 15/3216; F16J 15/3248; F16J 15/3268;
(Continued)

(56) References Cited

U.S. PATENT DOCUMENTS 5,826,883 A * 10/1998 Cho .................. F16J 15/126
277/410
2009/0014146 A1* 1/2009 Budd ................ B23K 1/0016
164/271

(Continued)

FOREIGN PATENT DOCUMENTS

DE 102007007405 B4 5/2012
DE 102014010269 A1 1/2016
(Continued)

OTHER PUBLICATIONS

U.S. Appl. No. 16/767,124, filed May 27, 2020.

*Primary Examiner* — Gilbert Y Lee
(74) *Attorney, Agent, or Firm* — Leydig, Voit & Mayer, Ltd.

(57) ABSTRACT

A seal arrangement for sealing a gap between a machine element comprising a shaft and a housing includes: at least one sealing element formed, at least partially, from polymeric material. The at least one sealing element is of annular design and is made of PTFE. The at least one sealing element has at least one first annular element and at least one second annular element. The at least one first element is electrically conductive and the at least one second element (Continued)

is electrically insulating. The at least one first element is arranged axially adjacently to the at least one second element. The at least one sealing element is provided with electrically conductive contact elements. The housing has an installation space forming an annular groove for the at least one sealing element. The installation space is provided with a lining forming an insulation.

6 Claims, 8 Drawing Sheets

(58) Field of Classification Search
CPC .. F16J 15/3276; F16J 15/3284; F16J 15/3296; F16J 15/44
See application file for complete search history.

(56) References Cited

U.S. PATENT DOCUMENTS

| | | |
|---|---|---|
| 2012/0119448 A1 | 5/2012 | Stewart |
| 2016/0010750 A1 | 1/2016 | Colineau |
| 2017/0009550 A1 | 1/2017 | Leuchtenberg |
| 2017/0172018 A1 | 6/2017 | Dilmaghanian |
| 2018/0112779 A1 | 4/2018 | Nahrwold |

FOREIGN PATENT DOCUMENTS

| | | |
|---|---|---|
| DE | 102016012552 A1 | 4/2018 |
| JP | S 60245874 A | 12/1985 |
| JP | 2015135156 A | 7/2015 |

* cited by examiner

SEAL ARRANGEMENT

CROSS-REFERENCE TO PRIOR APPLICATIONS

This application is a U.S. National Phase application under 35 U.S.C. § 371 of International Application No. PCT/EP2018/071917, filed on Aug. 13, 2018, and claims benefit to German Patent Application No. DE 10 2018 000 935.2, filed on Feb. 6, 2018; German Patent Application No. DE 10 2017 010 981.8, filed on Nov. 28, 2017; and German Patent Application No. DE 10 2017 010 979.6, filed on Nov. 28, 2017. The International Application was published in German on Jun. 6, 2019 as WO 2019/105606 under PCT Article 21(2).

FIELD

The invention relates to a seal arrangement for sealing a gap between a machine element and a housing, comprising at least one sealing element which is at least partially formed from polymeric material, wherein the sealing element is of annular design.

BACKGROUND

Seals, in particular dynamically stressed seals, wear over the intended service life, wherein various wear phenomena have an effect. The contact tension of the sealing element decreases due to material fatigue, and the contact force also decreases. The dimensions of the sealing element change due to wear and setting behavior. Such processes result initially in leakage and then in failure of the sealing system.

For leakage monitoring of seals, integrating a device for leakage monitoring into the seal is known. DE 10 2007 007 405 B4 discloses an electrical device for detecting the state of wear of a dynamic sealing element. The sealing element comprises an electrically conductive section and an electrically non-conductive section which is in contact with the machine element to be sealed. The machine element is also electrically conductive. As a result of wear of the sealing element, the electrically non-conductive sealing material wears so that the electrically conductive sealing material comes into contact with the machine element. In the process, a circuit closes and it can be ascertained that the sealing element is worn out.

In this embodiment, it is disadvantageous that no gradual changes in state can be detected. It can only be ascertained that the wear limit has been reached and that the sealing element has to be replaced in the short term.

SUMMARY

In an embodiment, the present invention provides a seal arrangement for sealing a gap between a machine element comprising a shaft and a housing, comprising: at least one sealing element comprising, at least partially, polymeric material, wherein the at least one sealing element is of annular design and comprises PTFE, wherein the at least one sealing element has at least one first annular element and at least one second annular element, wherein the at least one first element is electrically conductive and the at least one second element is electrically insulating, wherein the at least one first element is arranged axially adjacently to the at least one second element, wherein the at least one sealing element is provided with electrically conductive contact elements, wherein the housing has an installation space comprising an annular groove for the at least one sealing element, and wherein the installation space is provided with a lining forming an insulation.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
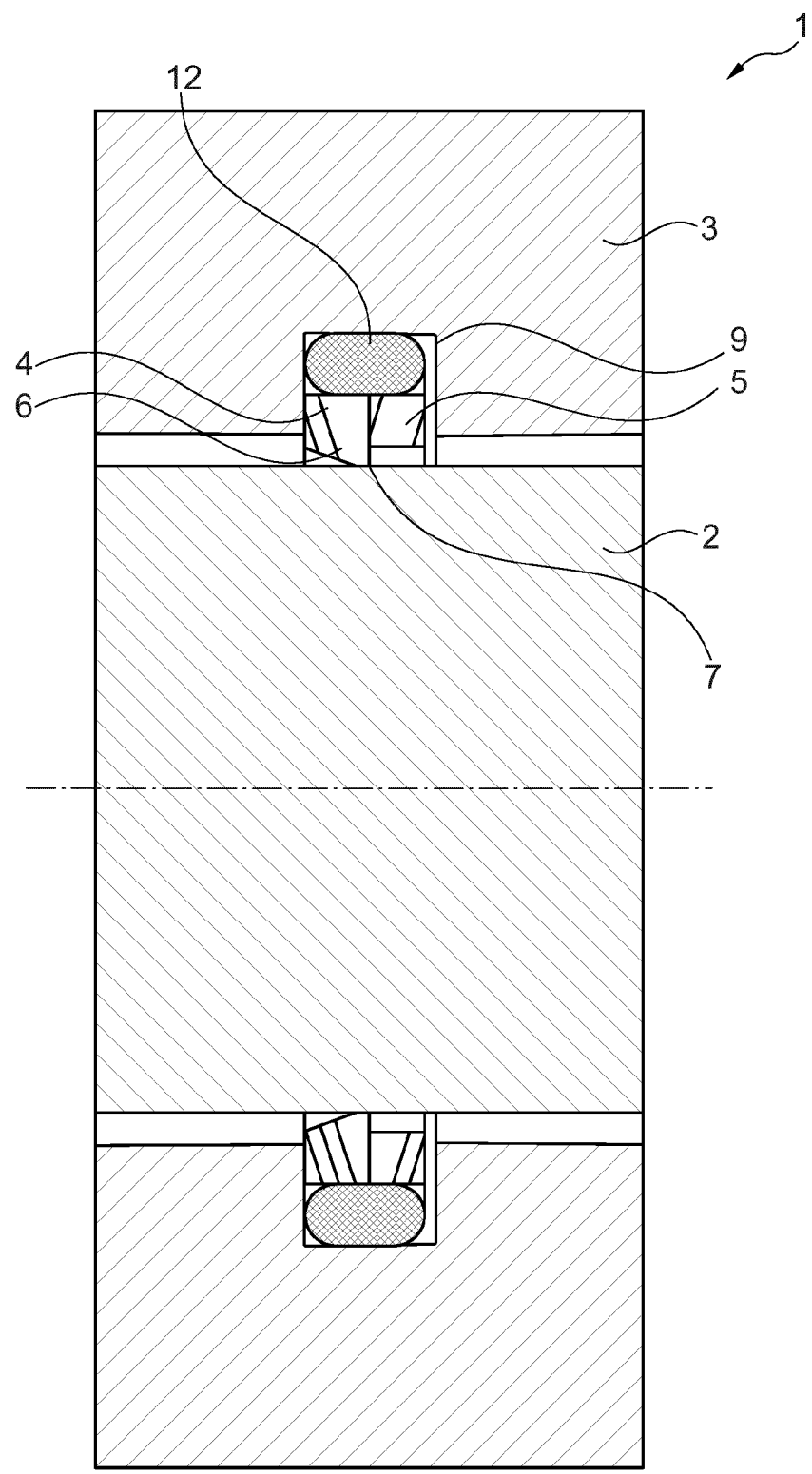
FIG. 1 shows a seal arrangement with a sealing element and a further sealing element.

In an embodiment, the present invention provides a seal arrangement which allows permanent state monitoring of the sealing function and which can be produced at low cost and is easy to install at the same time.

In an embodiment, the seal arrangement for sealing a gap between a machine element and a housing comprises at least one sealing element which is formed at least partially from polymeric material, wherein the sealing element is of annular design, wherein the sealing element has at least one first annular element and at least one second annular element, wherein the first element is electrically conductive and the second element is electrically insulating, wherein the first element is arranged axially with respect to the second element.

The elements may be produced in one manufacturing process and subsequently connected to each other to form the sealing element. This is advantageous in particular when the sealing element consists of a material which is not capable of injection molding. One such material is PTFE, for example. In this respect, the seal arrangement according to the invention is particularly advantageous when the sealing element is formed from PTFE.

A particular aspect about PTFE is that, in the case of a combination of a conductive and a non-conductive PTFE material, very good adhesion of the two materials to one another is achieved in the sintering process. A solid firmly bonded connection is obtained. Subsequently connecting the materials, on the other hand, is very difficult.

A sealing lip which bears against the machine element can be formed from the second element. The sealing lip results in a linear contact between sealing element and machine element and, as a consequence thereof, an improved sealing effect.

The material of the first element may be provided with electrically conductive particles. Especially ferrous or carbonaceous particles come into consideration as electrically conductive particles. It is in particular conceivable for the sealing element to be formed from an elastomeric material which is provided with electrically conductive particles.

For this purpose, a contact element may be attached to the sealing element on the outside. A contact surface is also understood here as a contact element.

The sealing element may have at least two elements, wherein a first element is arranged between the two second elements. A sealing lip may be formed from each of the two second sealing elements. This results in uniform pressing of the sealing element on the machine element. This reduces in particular the risk of tilting of the sealing element. Furthermore, the sealing lips may be arranged in such a way that they seal in opposite directions. In particular in the case of a translationally moved machine element, bidirectional sealing is thereby possible.

The housing may have an installation space for the sealing element, wherein the installation space is provided with a lining forming an insulation. In particular, when the machine element is configured as a shaft, the housing opening is generally circular. In this case, the installation space is formed in the shape of an annular groove in which the sealing element is arranged.

A further sealing element may be provided, which brings about the radial prestressing of the sealing element on the machine element. Thereby, the further machine element may be designed as an O-ring. The further sealing element is arranged on the outer circumferential side of the sealing element and causes the radial pressing of the sealing element on the machine element. In this embodiment, the sealing element is activated by the further sealing element.

The further sealing element may be formed from an elastomeric material and used as a contact element.

The figures show a seal arrangement 1 for sealing a gap between a machine element 2 and a housing 3. A sealing element 4 arranged between the machine element 2 and the housing 3 seals the gap. The sealing element 4 is arranged in an installation space 9 introduced into the housing 3. The installation space 9 is in the shape of a circumferential groove.

In the present embodiments, the machine element 2 is a rotationally and/or translationally movable machine element 2, for example a shaft.

The sealing element 4 consists of a polymeric plastic, here PTFE.

The sealing element 4 is of annular design, wherein the sealing element 4 has at least one first annular element 5 and at least one second annular element 6, wherein the first element 5 is electrically conductive and the second element 6 is electrically insulating, wherein the first element 5 is arranged axially adjacently to the second element 6. The first element 5 is bonded to the second element 6 in a firmly bonded manner.

A sealing lip 7 which bears in a sealing manner against the machine element 2 is formed from the second element 6. The material of the first element 5 is provided with electrically conductive particles.

FIG. 1 shows a first embodiment of the seal arrangement 1. The sealing element 4 is associated on the outer circumferential side with a further sealing element 12, which brings about radial pressing of the sealing element 4 on the machine element 2. The further sealing element 12 is designed as an O-ring and consists of an electrically insulating elastomeric material. The material of the further sealing element 12 may alternatively be provided with electrically conductive particles.

Figure 2:
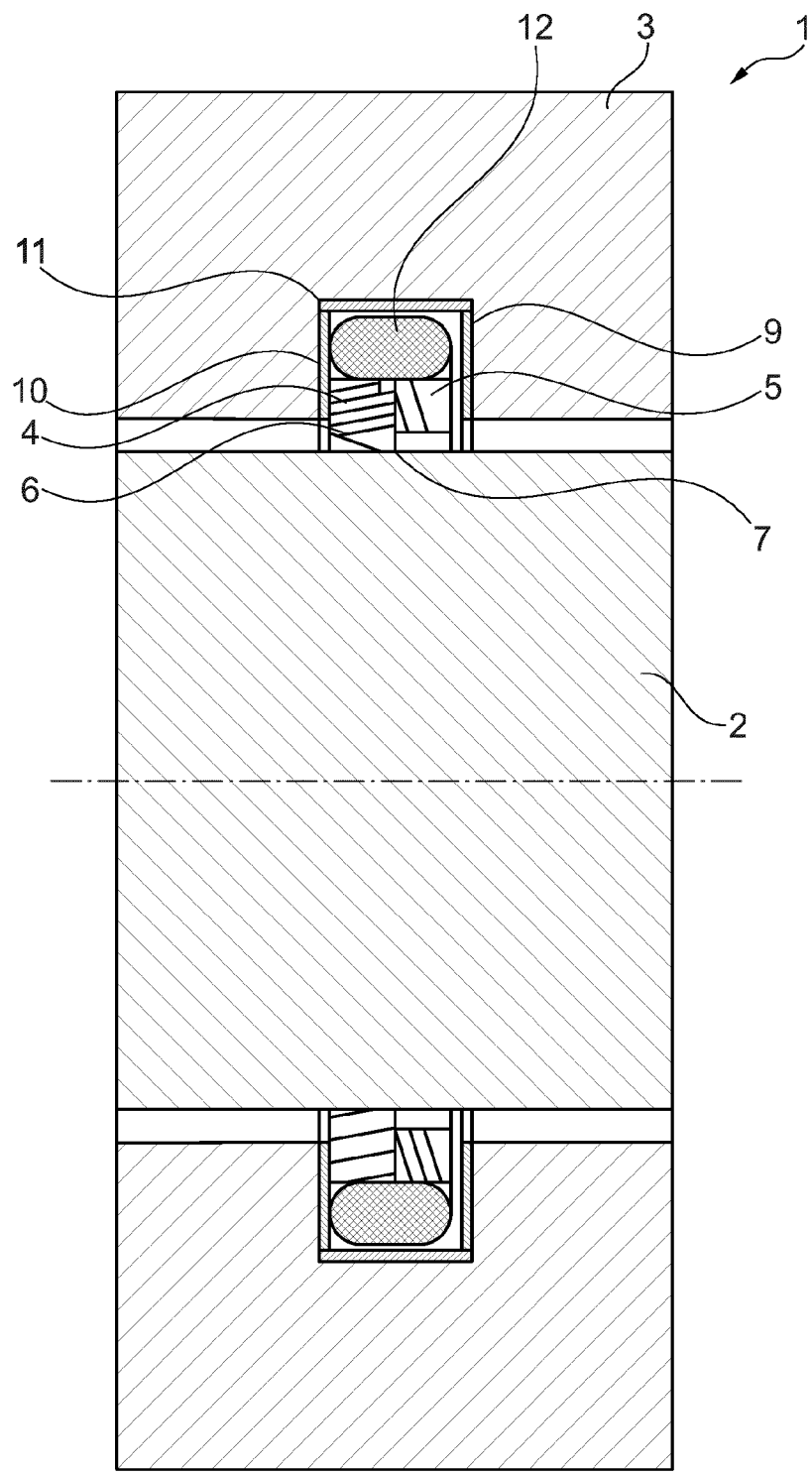
FIG. 2 shows a seal arrangement with a lining of the installation space.

FIG. 2 shows a seal arrangement 1 according to FIG. 1. In the present embodiment, the inner wall of the installation space is provided with an insulation 10, which brings about an electrical insulation of the sealing element 4 with respect to the housing 3. The insulation 10 is in the form of a lining 11 and consists of polymeric material.

Alternatively, the elements of the sealing element 4 and/or of the further sealing element 12 may also be designed to be electrically insulating. An enclosure may, for example, be provided for this purpose.

Figure 3:
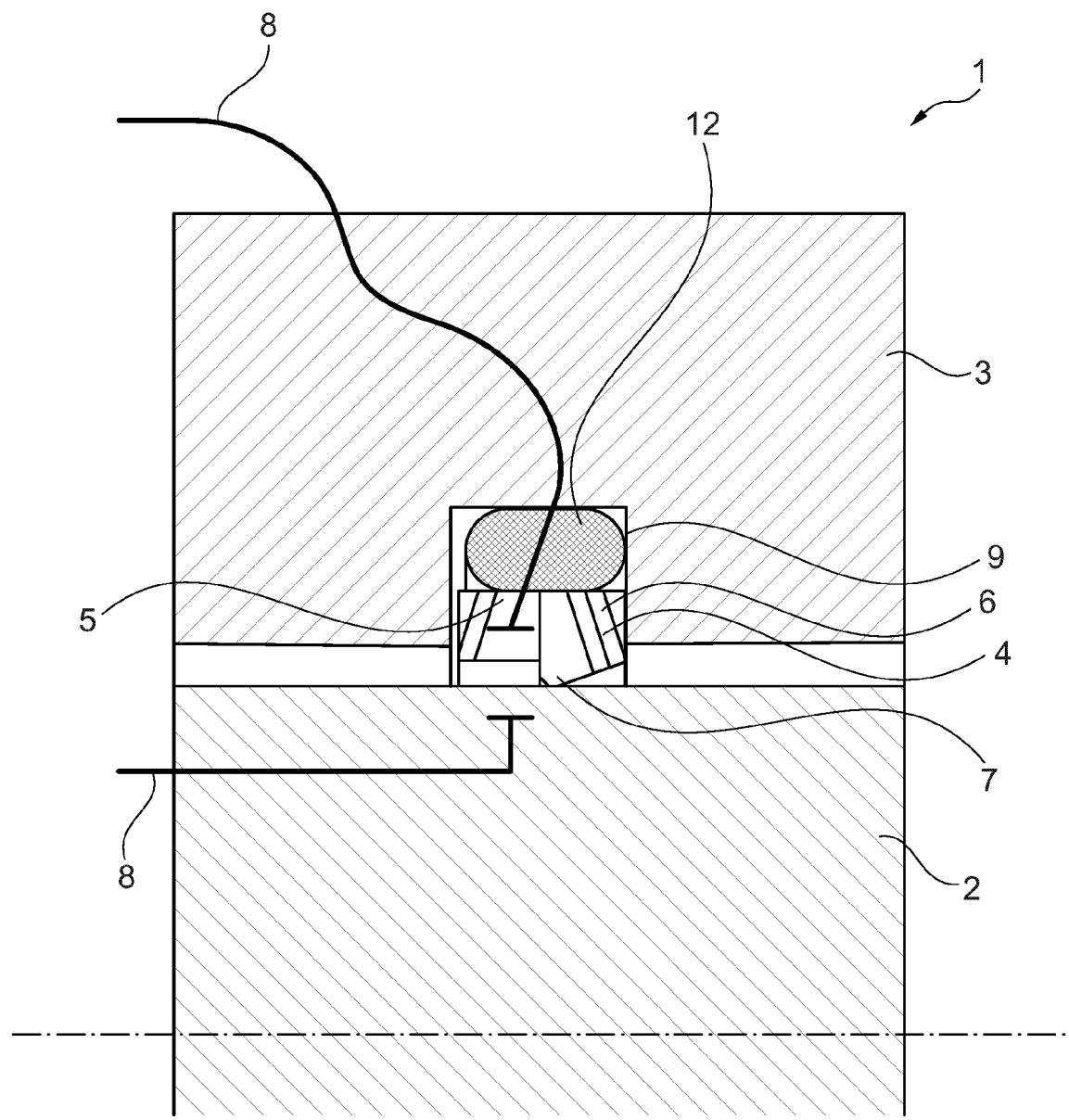
FIG. 3 shows a seal arrangement with a capacitive measuring path.

FIG. 3 shows a seal arrangement according to FIG. 1. In addition, the measuring path 8 of the capacitive measurement is shown here. The wear measurement is carried out by determining the capacitance between the two components machine element 2 and element 5, wherein changes in state of the seal arrangement 1 due to wear and the like are associated with a change in the capacitance. A continuous change in state can also be detected so that monitoring of the seal arrangement 1 is possible. The monitoring is carried out by means of an evaluation unit which may be connected to contact elements.

Figure 4:
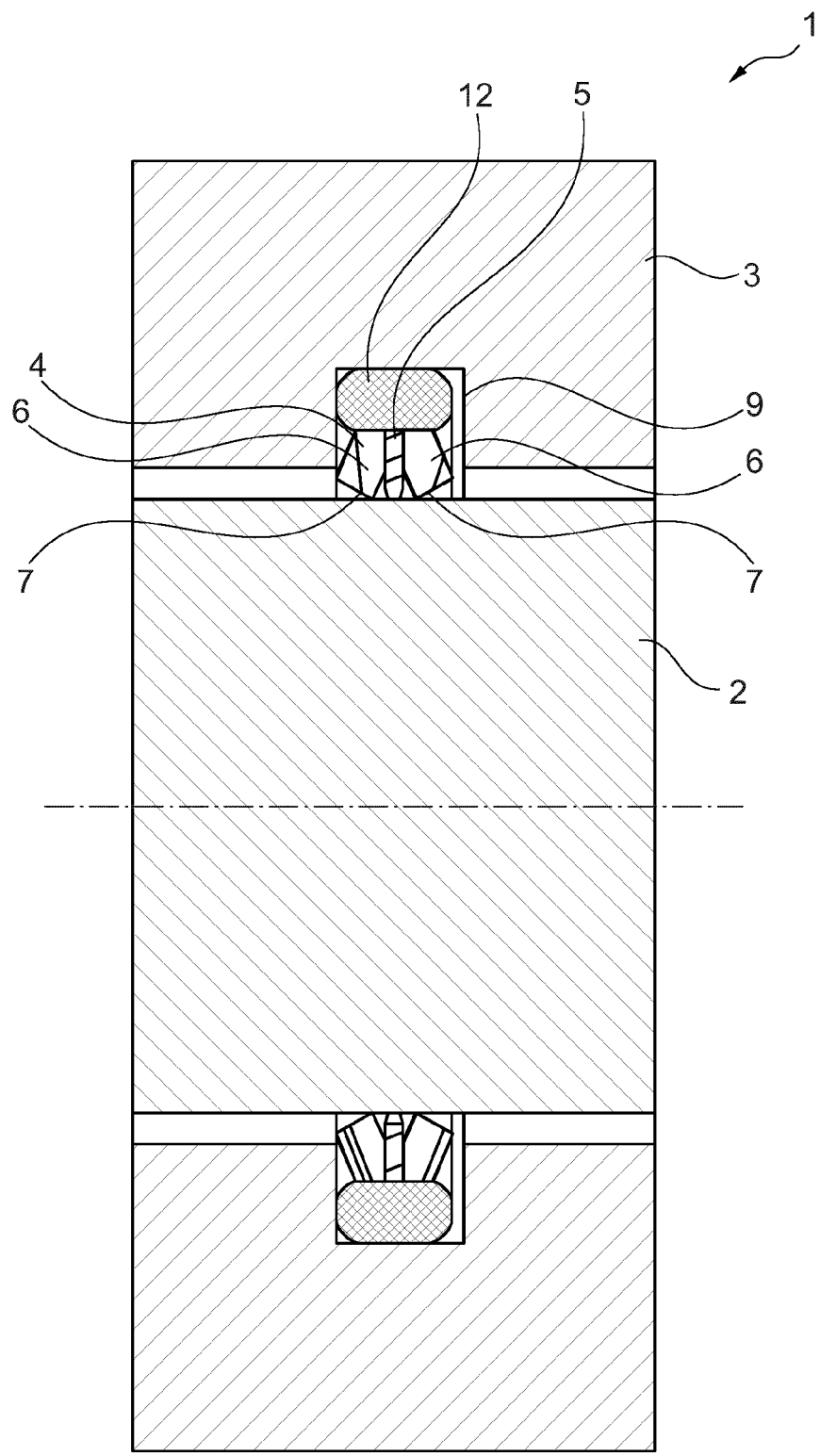
FIG. 4 shows a seal arrangement with two second elements.

FIG. 4 shows a seal arrangement 1 according to FIG. 1, wherein the sealing element 4 has two second elements 6, wherein a first element 5 is arranged between the two second elements 6.

Figure 5:
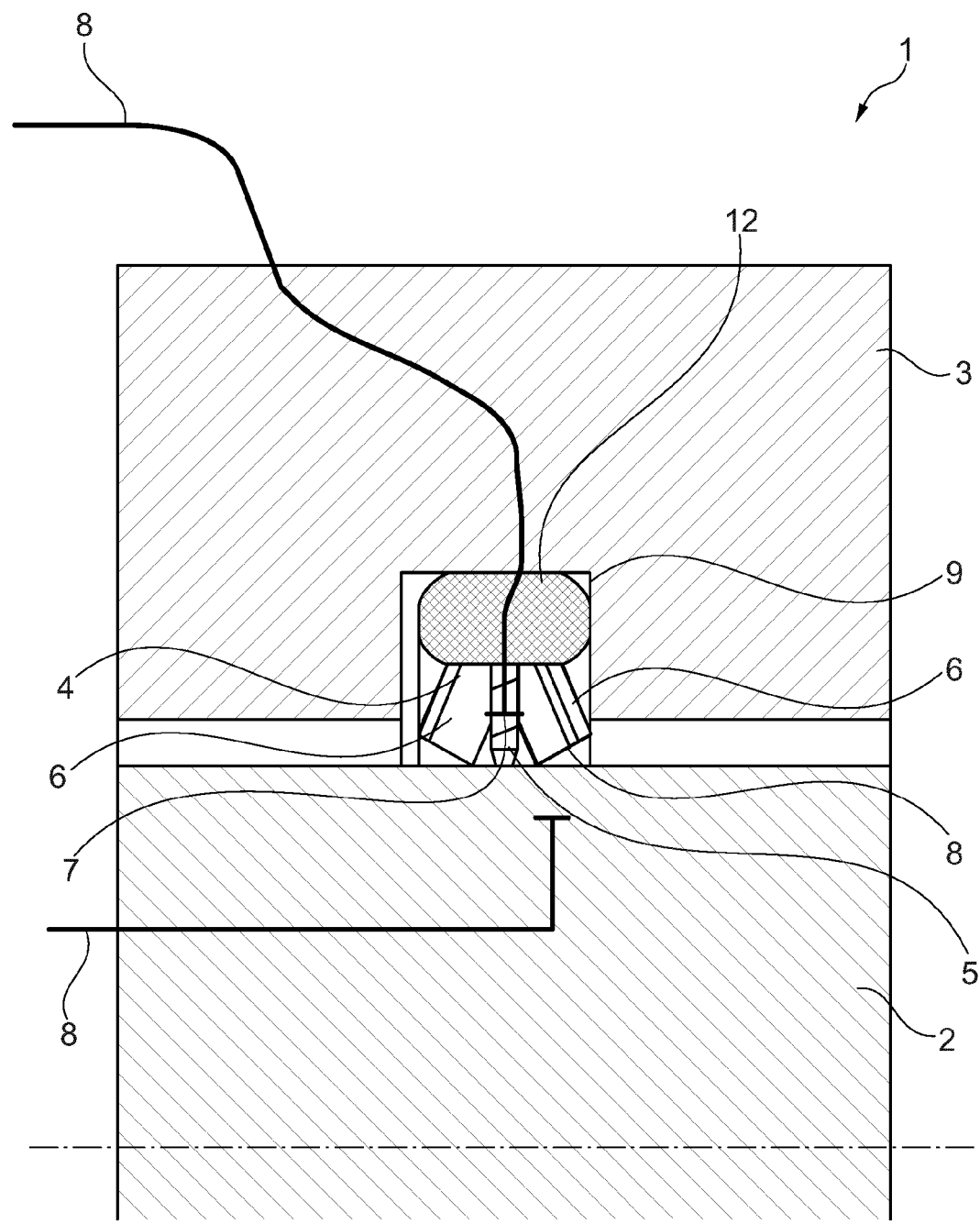
FIG. 5 shows a seal arrangement with a capacitive measuring path.

FIG. 5 shows a seal arrangement 1 according to FIG. 4, in which the measuring path for capacitive measurement is indicated.

Figure 6:
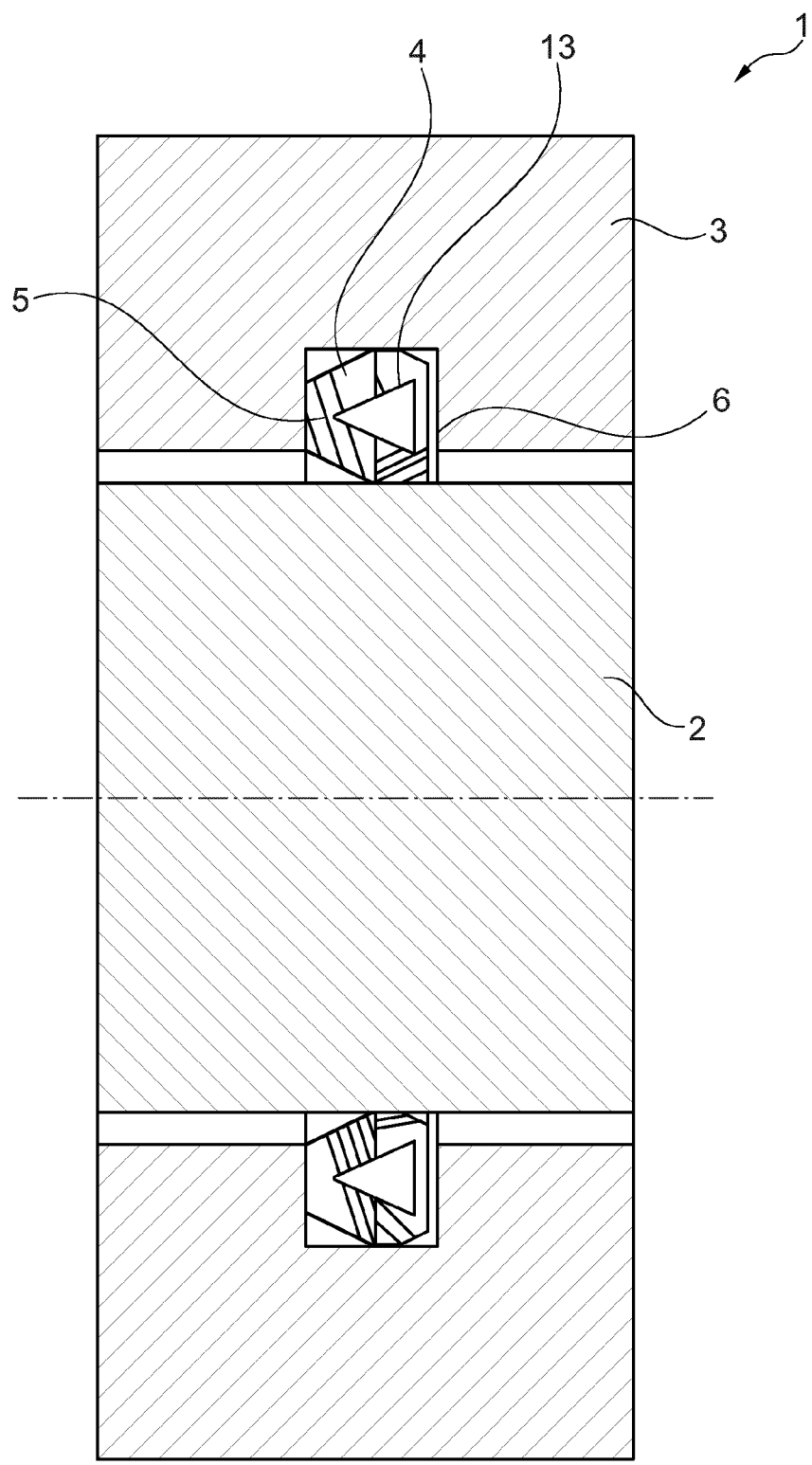
FIG. 6 shows a sealing element in the form of a spring-supported groove ring.

FIG. 6 shows a seal arrangement 1, with which the sealing element 4 is designed as a groove ring, wherein a spring element 13 which brings about radial pressing of the sealing element 4 on the machine element 2 is associated with the groove of the groove ring. The sealing element 4 is made of PTFE and comprises an electrically conductive first element 5 and an electrically insulating second element 6. The sealing element 4 must be insulated with respect to the housing 3.

Figure 7:
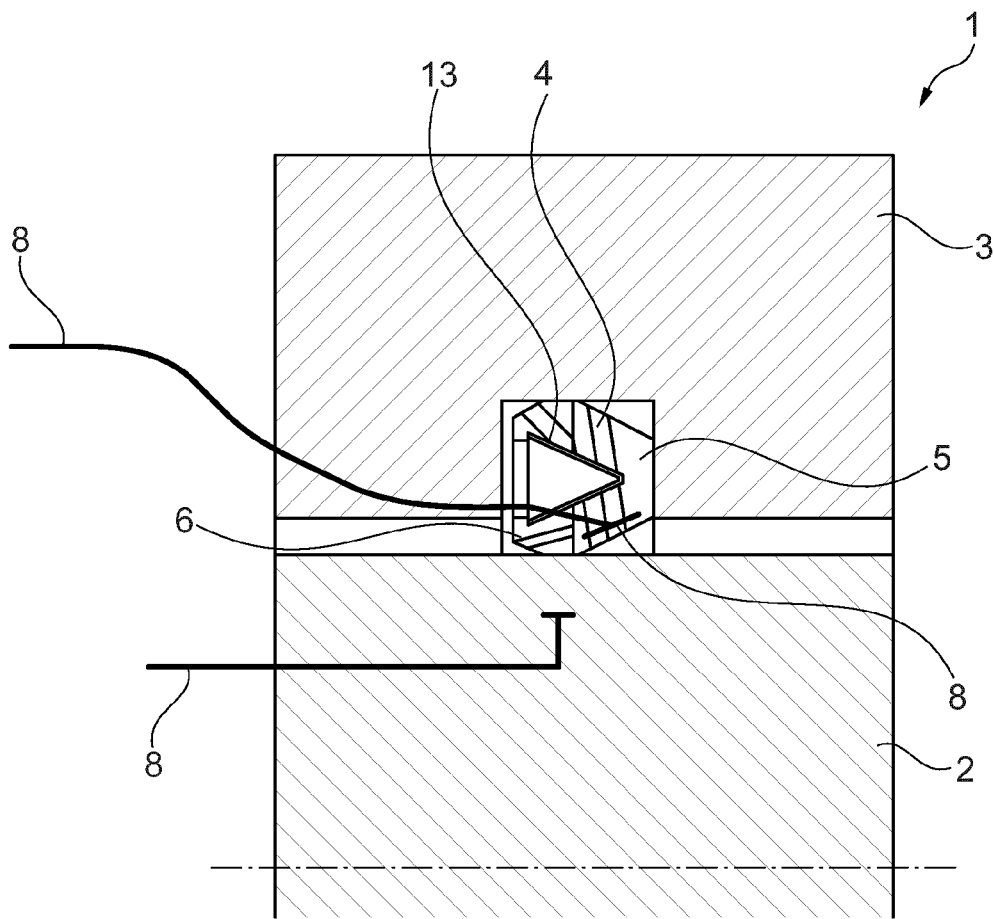
FIG. 7 shows a sealing element according to FIG. 6 with contact elements.

FIG. 7 shows a seal arrangement 1 according to FIG. 6, wherein the measuring path 8 for capacitive measurement is also indicated, which detects the capacitance between the machine element 2 and the first element 5 by means of an evaluation unit.

Figure 8:
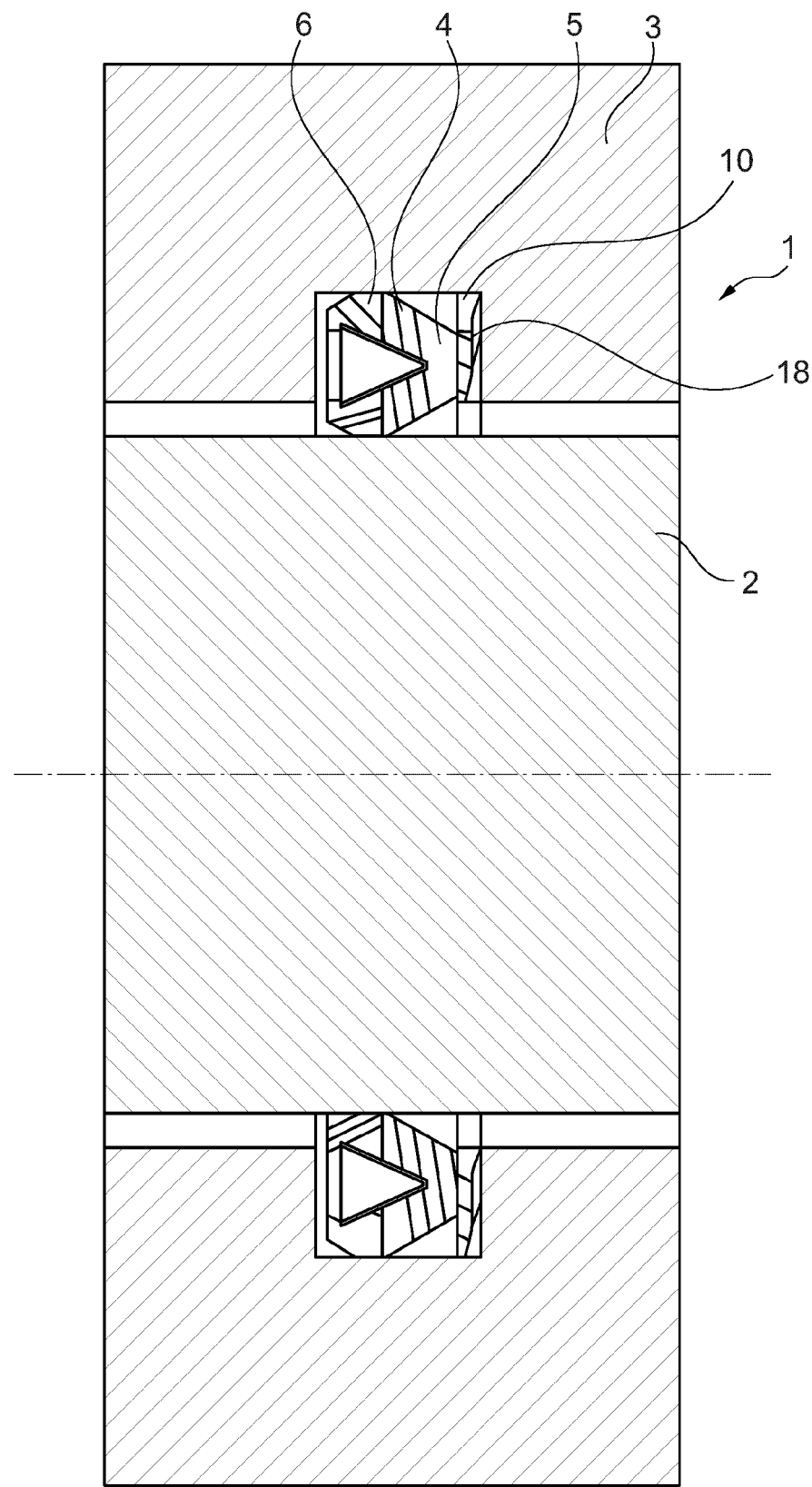
FIG. 8 shows a sealing element according to FIG. 6 with insulation.

FIG. 8 shows a seal arrangement 1 according to FIG. 6, wherein a contact element 18 is provided, which is embedded in a disk-shaped insulation 10. The contact element 18 bears against the second element 6 of the sealing element 4 and may be integrated in a measuring path 8.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A seal arrangement for sealing a gap between a machine element comprising a shaft and a housing, comprising:
   at least one sealing element comprising, at least partially, from polymeric material,
   wherein the at least one sealing element is of annular design and comprises PTFE,
   wherein the at least one sealing element has at least one first annular element and at least one second annular element,
   wherein the at least one first element is electrically conductive and the at least one second element is electrically insulating,
   wherein the at least one first element is arranged axially adjacently to the at least one second element,
   wherein the at least one sealing element is provided with electrically conductive contact elements,
   wherein the housing has an installation space comprising an annular groove for the at least one sealing element, and
   wherein the installation space is provided with a lining forming an insulation.

2. The seal arrangement according to claim 1, wherein a sealing lip which bears against the machine element is formed from the at least one second element.

3. The seal arrangement according to claim 1, wherein a material of the at least one first element is provided with electrically conductive particles.

4. The seal arrangement according to claim 1, wherein the at least one sealing element has comprises two second elements, and
   wherein the at least one first element is arranged between the two second elements.

5. The seal arrangement according to claim 1, wherein a further sealing element is provided, which brings about radial prestressing of the at least one sealing element against the machine element.

6. The seal arrangement according to claim 5, wherein the further sealing element comprises an elastomeric material.

* * * * *